United States Patent [19]
Coyle

[11] Patent Number: 5,621,581
[45] Date of Patent: Apr. 15, 1997

[54] SYSTEM FOR TRANSCRIPTION AND PLAYBACK OF SONIC SIGNALS

[76] Inventor: Jan R. Coyle, 9380 S.W. 80th Apt. D, Tigard, Oreg. 97223

[21] Appl. No.: 912,221

[22] Filed: Jul. 10, 1992

Related U.S. Application Data

[63] Continuation of Ser. No. 794,325, Nov. 12, 1991, abandoned, which is a continuation of Ser. No. 471,051, Jan. 18, 1990, which is a continuation of Ser. No. 368,137, Jun. 16, 1989, which is a continuation of Ser. No. 262,068, Oct. 24, 1988, which is a continuation of Ser. No. 928,930, Nov. 10, 1986, which is a continuation-in-part of Ser. No. 854,329, Apr. 21, 1986, abandoned.

[51] Int. Cl.$^6$ ................................................. G11B 5/035
[52] U.S. Cl. ................................................................ 360/65
[58] Field of Search ................................. 360/65, 13, 15, 360/18, 67

[56] References Cited

U.S. PATENT DOCUMENTS 4,412,106 10/1983 Pavel.

OTHER PUBLICATIONS

"Real Time Spectrum Analyzes for your Hi–Fi", Cota et al, Radio Electronics, Apr. 1985.
TA–630D Onkyo Instruction Manual, pp. 3 & 4 Aug. 1979.

*Primary Examiner*—Robert W. Beausoliel, Jr.

[57] ABSTRACT

A system for playback or transcription of sonic signals includes the headphone output terminal of a sonic signal record/playback system linked to a device for adjusting the impedance to the signal from the headphone output terminal and for passing the transformed sonic signal to the microphone input terminal or recording input means of a sonic signal playback or playback and record device.

30 Claims, 4 Drawing Sheets

SYSTEM FOR TRANSCRIPTION AND PLAYBACK OF SONIC SIGNALS

This application is a continuation of application Ser. No. 07/794,325, filed Nov. 12, 1991, now abandoned, which is a continuation of application Ser. No. 07/471,051, filed Jan. 18, 1990, which is a continuation of application Ser. No. 07/368,137, filed Jun. 16, 1989, which is a continuation of application Ser. No. 07/262,068, filed Oct. 24, 1988, which is a continuation of application Ser. No. 06/928,930, filed Nov. 10, 1986, which is a continuation-in-part of application Ser. No. 06/854,329, filed Apr. 21, 1986, now abandoned, entitled "SYSTEM FOR TRANSCRIPTION AND PLAYBACK OF SONIC SIGNALS" by JAN R. COYLE.

This invention relates to systems for playback, transcription and transformation of sonic signals, and more particularly to systems for transforming sonic signals fed through headphone output means including means for increasing, maintaining or decreasing the impedance to such signals received from sonic signal headphone output means and for passing the signals, after adjusting the impedance to them, as necessary, through microphone input means or recording input means of means for recording and playing back sonic signals. Preferably, the microphone input means or recording input means are included in a playback or record/playback means for sonic signals such as a magnetic tape cassette deck or a video cassette recorder (VCR).

In preferred embodiments, these systems include headphone means that can be linked to the headphone output means of a system for playback and recording of sonic signals. Preferably, such headphone means include means for increasing and/or decreasing the impedance to sonic signals from sonic signal headphone output means. Such increasing/decreasing means is preferably an adjustable potentiometer that can provide at least 200 ohms, and preferably at least 5 kilo ohms in resistance to sonic signals from the headphone output means. Such headphone means includes speaker means to which the sonic signals pass from the potentiometer. Signals from the potentiometer then pass to sonic signal microphone input means or sonic signal recording input means, either directly from the potentiometer means or from the potentiometer means, via sonic signal headphone speaker means to the microphone input means or recording input means.

In some embodiments, the sonic signal transforming means of this invention is linked, at one end, to the headphone output means for a sonic signal record/playback device such as a magnetic tape cassette deck and, at the other end, to the microphone input means or recording input means of a sonic signal playback/record means or playback means or even speaker means such as a magnetic tape playback record means, a VCR or a compact disc player. In these embodiments, the signal-to-noise ratio of the sonic signals coming from a source such as magnetic tape, a radio, a record player, or compact disc player can be improved by adjusting the means for controlling the sonic signal level output from the system including the headphone output means, and/or by adjusting the means for control, ling sonic signal level input to the system including the microphone input means or recording input means.

Preferred embodiments of such systems can permit the sonic signal output level from the headphone output means to be as low as minus 71 decibels and the input level at the microphone input means as high as plus 9 or 10 decibels. By appropriate adjustment of the signal level at the headphone output means, and at the microphone input means or recording input means, signal-to-noise ratio in sonic signals to be played back or transcribed can be substantially improved.

This invention can better be understood by reference to the drawings, in which.

Figure 1:
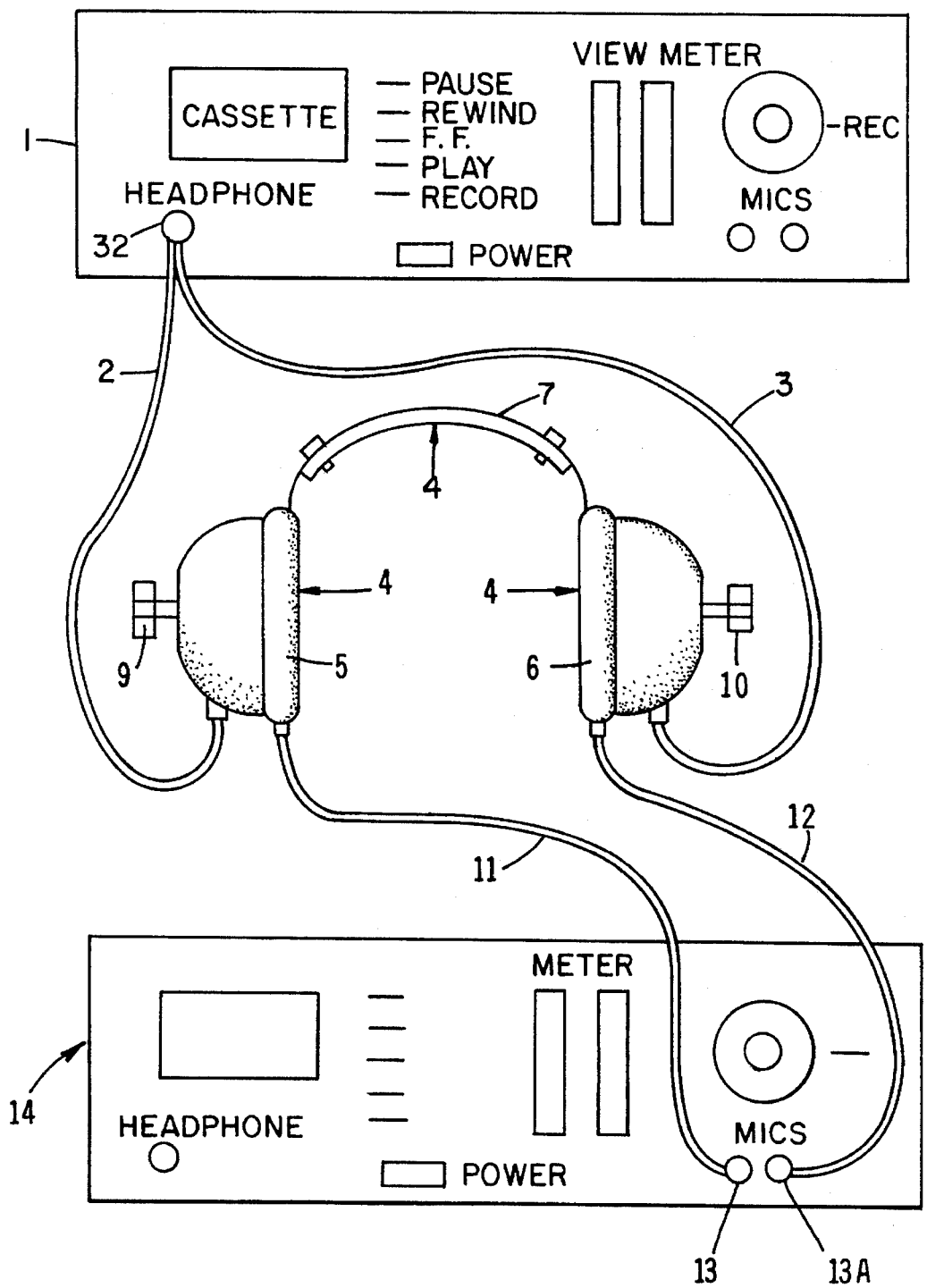
FIG. 1 shows a preferred embodiment of the system of this invention including headphones with adjustable potentiometers linked, on one end, to the headphone output means of a magnetic tape cassette record/playback device, and, at the other end to the microphone input of a similar device.

In FIG. 1, a conventional sonic signal record/playback device such as a cassette tape playback device 1 is joined, via leads 2 and 3, to headphone set 4 comprising headphones 5 and 6 joined to one another by strap 7. Headphones 5 and 6 include adjustable potentiometers having rheostats 9 and 10. Headphones 6 and 7 are linked, via leads 11 and 12, to the microphone inputs 12 and 13 of sonic signal record/playback device 14.

Figure 2:
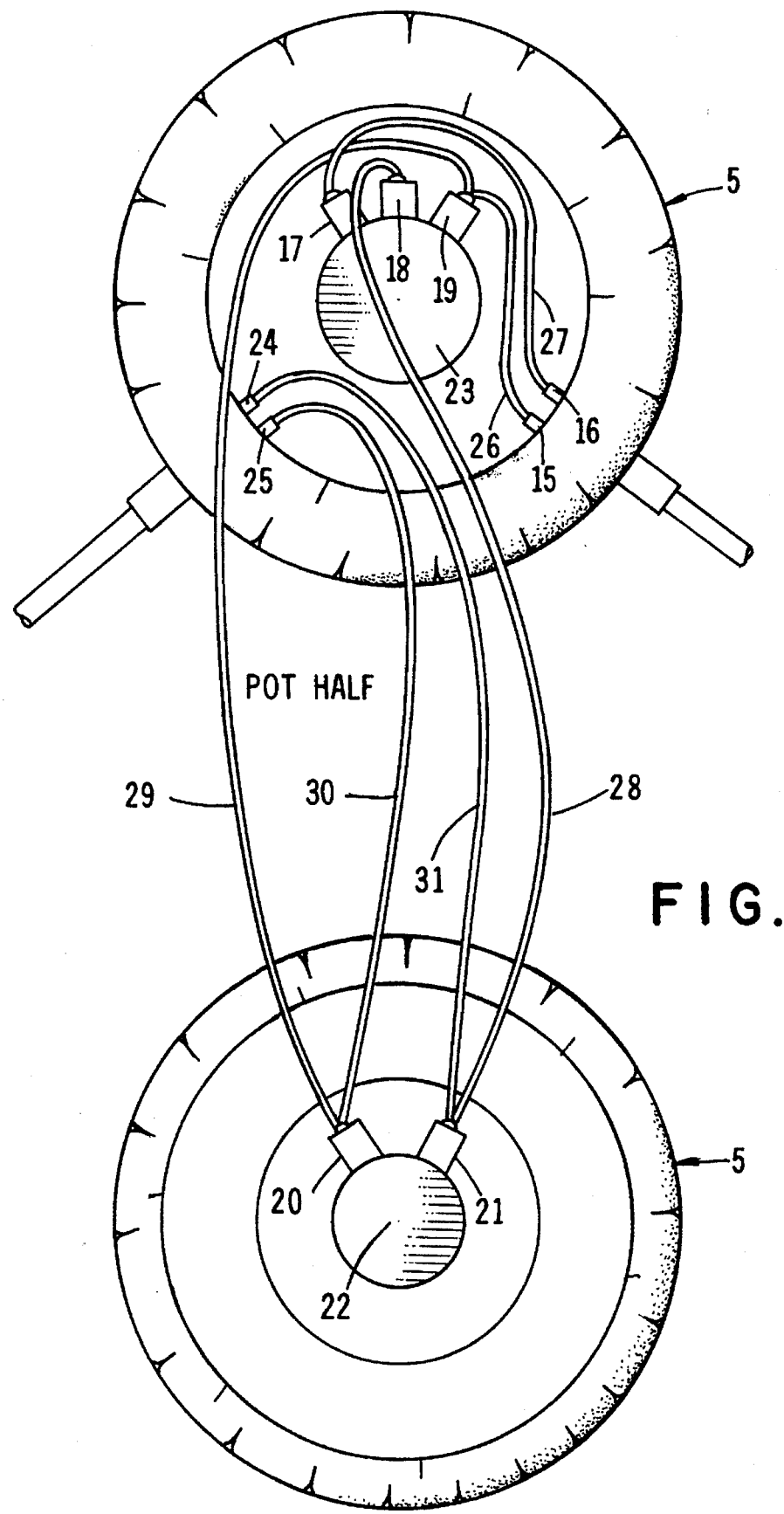
FIG. 2 shows the wiring inside the headphones depicted in FIG. 1.

FIG. 2 shows the wiring inside each of headphones 5 and 6. Headphone input terminals 15 and 16 are linked to terminals 17 and 19 of adjustable potentiometer 22 by leads 26 and 27. Potentiometer terminals 18 and 19 are linked to speaker input/output terminals 20 and 21 by leads 28 and 29. Speaker input/output terminals 20 and 21 are linked, in turn, to terminals 24 and 25, by leads 30 and 31 to feed signals to microphone inputs 12 and 13 of sonic signal record/playback device 14. If speaker 22 were not present, leads 28 and 29 would be wired directly to terminals 24 and 25. If necessary or desirable, the speakers can be replaced with one or more resistors.

Adjustment of potentiometer 23 by movement of rheostat 9 permits adjustment of the impedance offered to the sonic signals from headphone output terminal 32, thus permitting adjustment of the signal-to-noise ratio and improvement of the fidelity and quality of this signal. Although sonic signal transformation means are shown in FIGS. 1 and 2 as headphones external to record/playback device 1, such a system could be internal to tape record/playback device 1.

Figure 3:
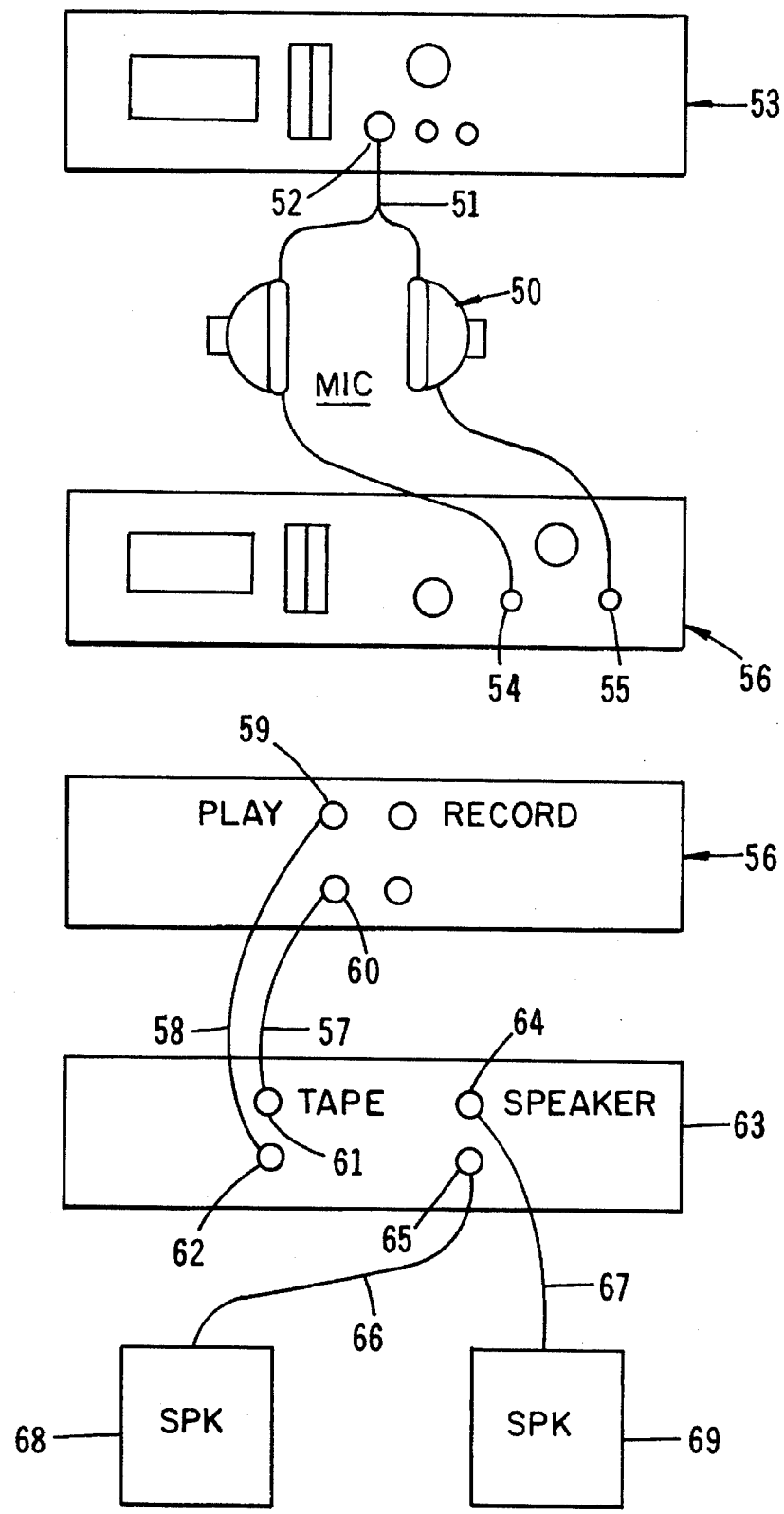
FIG. 3 shows a system for playback of recorded sonic signals with improved fidelity and quality and improved signal-to-noise ratio.

FIG. 3 shows a system for playback of a sonic signal from a first source without recording of the signal, but with improvement in its quality, fidelity and signal-to-noise ratio. In this system, headphones 50 are linked by lead 51 to headphone output terminal 52 of sonic signal record/playback device 53 and, at their other end, to microphone inputs 54 and 55 of sonic signal record/playback device 56. In turn, the "play" terminals 59 and 60 at the back of record/playback device 56 are linked, via leads 57 and 58, to the tape input terminal 61 and 62 of amplifier 63. The speaker terminals 64 and 65 of amplifier 63 are linked, by leads 66 and 67, to conventional, speakers 68 and 69. By proper adjustment, preferably a reduction of the signal output level from record/playback device 53, and by proper adjustment of the signal input at the microphone inputs of record/playback device 56, the signal-to-noise ratio, fidelity and quality of the signals originating at record/playback device 53 can be substantially improved.

Figure 4:
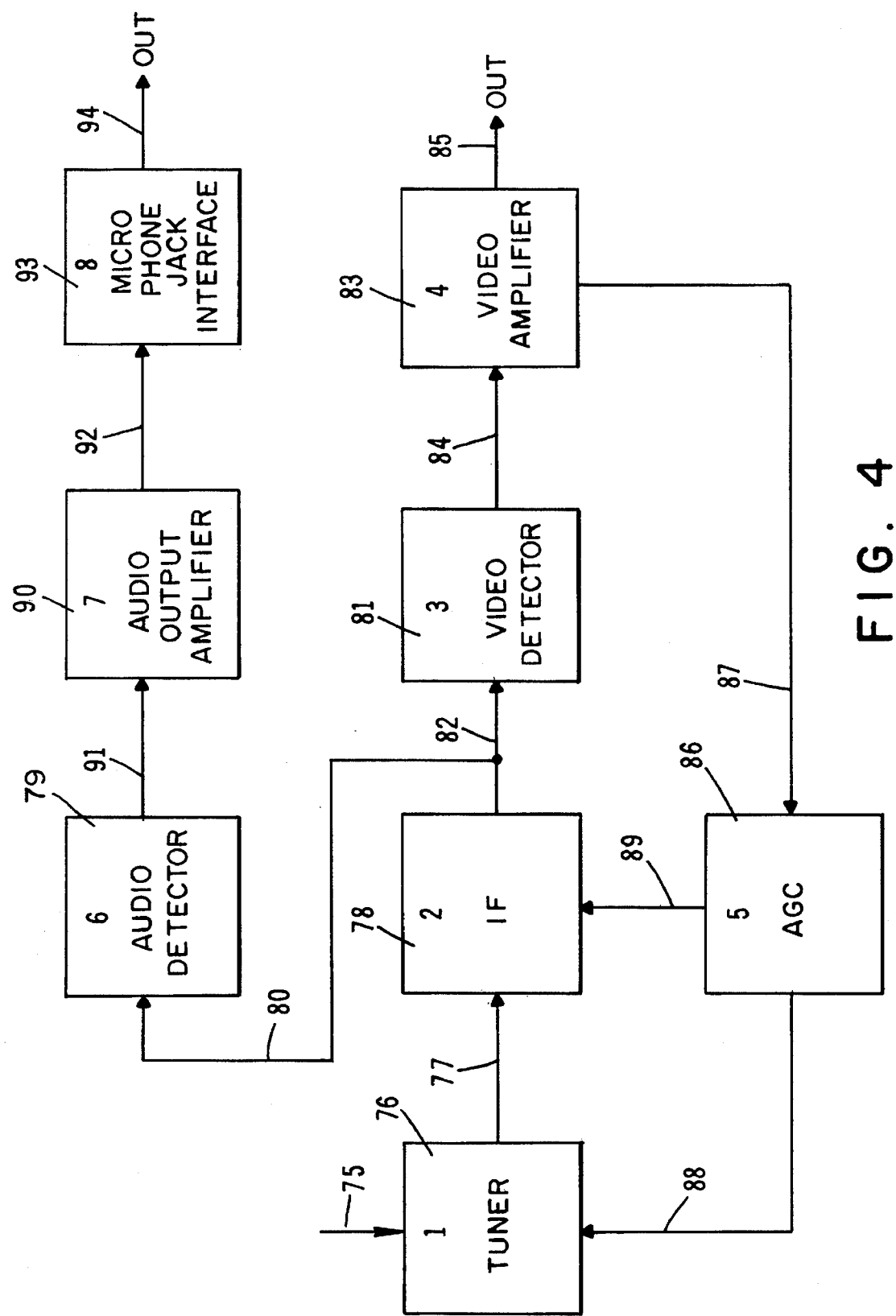
FIG. 4 is a block diagram of another embodiment of the system of this invention for transforming the audio portion of a television signal that includes both audio and video portions by means of a video cassette recorder.

FIG. 4 shows a system for recording a television signal by means of a video cassette recorder. The system includes means for transforming the audio portion (but not the video portion) of the television signal. The television signal enters the system on path 75, and passes into tuner 76 for channel section. The signal then appears on path 77, and passes to intermediate frequency amplifier 78, which removes the carrier, if any, from the signal, and passers the audio portion of the signal to audio detector 79 on path 80 and the video portion of the signal, to video detector 81 on path 82. The signal from video detector 81 passes to low level video amplifier 83 on path 84. Low level video amplifier 83 produces an output video signal on path 85 to the video cassette recorder and a signal for the automatic gain control circular 86 on path 87 to establish proper gain control by means of signals passing to tuner 76 and interface 78 on paths 88 and 89, respectively.

The audio signal from intermediate frequency amplifier 78 passes to audio detector 79 on path 80 and then to the audio output amplifier 90 on path 91. The audio signal emerging from audio output amplifier 90 passes on path 92 to output circuit 93, which, in turn, includes means for transforming the audio signal for delivery on path 94 to the microphone input jack of the video cassette recorder.

What is claimed is:

1. A system for playback of sonic signals other than sonic signals from a microphone, and for improving the quality of said sonic signals, comprising:

sonic signal playback means having microphone input circuitry means;

means for transforming said sonic signals prior to inputting said sonic signals to said microphone input circuitry means, said means for transforming including means for increasing, decreasing or maintaining the impedance to said sonic signals;

means for producing and passing said sonic signals to said means for transforming; and means for passing said sonic signals from said means for transforming to said microphone input circuitry means, whereby said sonic signals are improved in quality.

2. The system of claim 1 including sonic signal recording means incorporated in said playback means and wherein the sonic signal recording means is a video cassette recorder.

3. The system of claim 1 wherein said means for passing sonic signals to said signal transforming means includes means for adjusting the sonic signal level at said sonic signal microphone input means.

4. The system of claim 1 wherein said transforming means includes at least one variable resistor.

5. The system of claim 1 wherein said transforming means has a plurality of separate channels for said sonic signals wherein said channels are relatively adjustable.

6. The system of claim 1 wherein said transforming means is incorporated in said sonic signal playback means.

7. The system of claim 1 including sonic signal recording means incorporated in said sonic signal playback means.

8. The system of claim 1 wherein the means for passing said sonic signal to said sonic signal transforming means comprises headphone output means from sonic signal player means, and said transforming means has a plurality of channels for said sonic signals wherein said channels are relatively adjustable.

9. The system of claim 1 wherein said means for passing said sonic signal to said sonic signal transforming means comprises headphone output means from sonic signal player means, and said transforming means has a plurality of channels for said sonic signals and includes variable resistance means for relatively adjusting said channels in advance of said microphone input means.

10. The system of claim 9 wherein said headphone output means, said transforming means and said microphone input means are incorporated in a player and playback apparatus.

11. The system of claim 1 wherein said transforming means includes potentiometer means.

12. The system of claim 11 wherein said transforming means also includes fixed resistance means.

13. The system of claim 1 wherein the means for generating and passing said sonic signals to said sonic signal transforming means comprises speaker output means.

14. The system of claim 1 wherein the means for generating and passing said sonic signals to said sonic signal transforming means comprises audio output amplifier means.

15. A system for transcription of sonic signals, other than sonic signals from a microphone, and for improving the quality of said sonic signals, comprising:

sonic signal recording means having microphone input circuitry means;

means for transforming said sonic signals prior to inputting said sonic signals to said microphone input circuitry means, said means for transforming including means for increasing, decreasing or maintaining the impedance to said sonic signals;

means for producing and passing said sonic signals to said means for transforming; and means for passing said sonic signals from said means for transforming to said microphone input circuitry means, whereby said sonic signals are improved in quality.

16. The system of claim 15 wherein the sonic signal recording means is a video cassette recorder.

17. The system of claim 15 wherein said means for passing sonic signals to said signal transforming means includes means for adjusting the sonic signal level at said sonic signal microphone input means.

18. The system of claim 15 wherein said transforming means includes at least one variable resistor.

19. The system of claim 15 wherein said transforming means has a plurality of separate channels for said sonic signals wherein said channels are relatively adjustable.

20. The system of claim 15 wherein said transforming means is incorporated in said sonic signal recording means.

21. The system of claim 15 wherein said means for passing said sonic signal to said signal transforming means comprises headphone output means from sonic signal player means.

22. The system of claim 15 including sonic signal player means incorporated in said sonic signal recording means.

23. The system of claim 15 wherein said means for passing said sonic signal to said signal transforming means comprises headphone output means from sonic signal player means.

24. The system of claim 15 wherein the means for passing said sonic signal to said sonic signal transforming means comprises headphone output means from sonic signal player means, and said transforming means has a plurality of channels for said sonic signals wherein said channels are relatively adjustable.

25. The system of claim 15 wherein said means for passing said sonic signal to said sonic signal transforming means comprises headphone output means from sonic signal player means, and said transforming means has a plurality of channels for said sonic signals and includes variable resistance means for relatively adjusting said channels in advance of said microphone input means.

26. The system of claim 25 wherein said headphone output means, said transforming means and said microphone input means are incorporated in a player and recording apparatus.

27. The system of claim 15 wherein said transforming means includes potentiometer means.

28. The system of claim 27 wherein said transforming means includes fixed resistance means.

29. The system of claim 15 wherein the means for generating and passing said sonic signals to said sonic signal transforming means comprises speaker output means.

30. The system of claim 15 wherein the means for generating and passing said sonic signals to said sonic signal transforming means comprises audio output amplifier means.

* * * * *